US012761087B2

(12) United States Patent
Anderson et al.

(10) Patent No.: US 12,761,087 B2
(45) Date of Patent: Oct. 13, 2026

(54) NON-CONTACTING TEMPERATURE MEASUREMENT SYSTEM FOR AUTOMATED FIBER PLACEMENT

(71) Applicant: University of South Carolina, Columbia, SC (US)

(72) Inventors: Andrew D. Anderson, Columbia, SC (US); Christopher Sacco, Cayce, SC (US)

(73) Assignee: University of South Carolina, Columbia, SC (US)

( * ) Notice: Subject to any disclaimer, the term of this patent is extended or adjusted under 35 U.S.C. 154(b) by 806 days.

(21) Appl. No.: 17/898,708

(22) Filed: Aug. 30, 2022

(65) Prior Publication Data

US 2023/0066485 A1 Mar. 2, 2023

Related U.S. Application Data

(60) Provisional application No. 63/238,976, filed on Aug. 31, 2021.

(51) Int. Cl.

| | |
|---|---|
| ***G01K 7/36*** | (2006.01) |
| ***B29C 70/38*** | (2006.01) |
| ***B29C 70/54*** | (2006.01) |
| ***B29K 307/04*** | (2006.01) |

(52) U.S. Cl.
CPC ................ *G01K 7/36* (2013.01); *B29C 70/54* (2013.01); *B29C 70/382* (2013.01); *B29K 2307/04* (2013.01)

(58) Field of Classification Search
CPC .......... G01K 7/36; G01K 7/38; B29C 70/382; B29C 70/384
See application file for complete search history.

(56) References Cited

U.S. PATENT DOCUMENTS 3,936,734 A * 2/1976 Brandli .................. G01R 27/02 374/176
2014/0198824 A1* 7/2014 Nagl ........................ G01K 1/20 374/163
2023/0373168 A1* 11/2023 Nakao ..................... B29C 70/16

FOREIGN PATENT DOCUMENTS

AT 387853 B * 3/1989 ............... G01K 7/36

* cited by examiner

*Primary Examiner* — Seyed Masoud Malekzadeh
*Assistant Examiner* — Vipul Malik
(74) *Attorney, Agent, or Firm* — Douglas L. Lineberry

(57) ABSTRACT

Described herein are devices, methods and systems for measuring temperature in Automated Fiber Placement materials without contacting same via an antennae to measure current induced within an electromagnetic coil to accurately measure the temperature of the materials employed in the Automated Fiber Placement process.

3 Claims, 1 Drawing Sheet

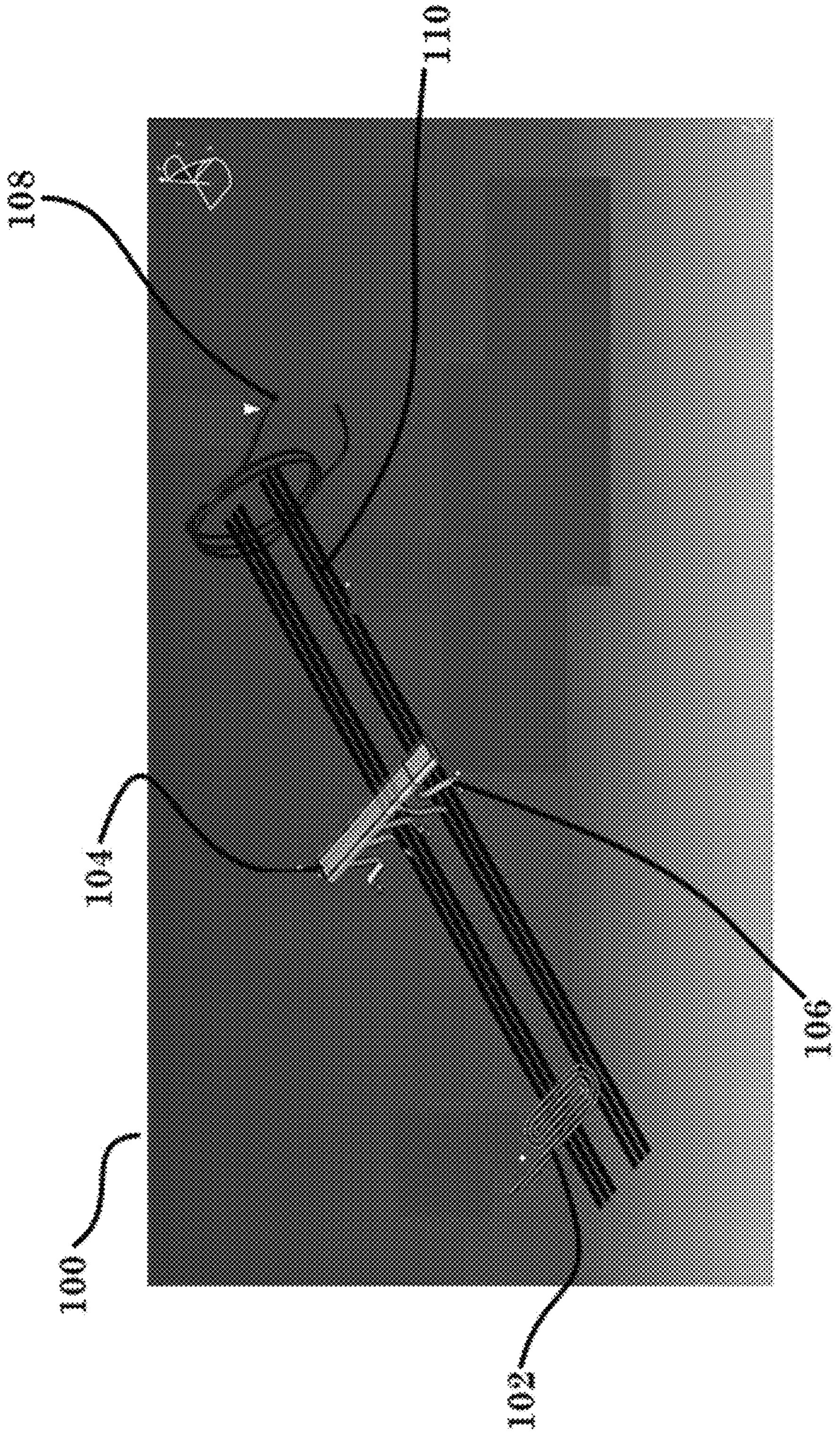
110
108
104
106
100
102

NON-CONTACTING TEMPERATURE MEASUREMENT SYSTEM FOR AUTOMATED FIBER PLACEMENT

TECHNICAL FIELD

The subject matter disclosed herein is generally directed to devices, methods, and systems for measuring temperature in Automated Fiber Placement materials without contacting same via an antennae to measure current induced within an electromagnetic coil to accurately measure the temperature of the materials employed in the Automated Fiber Placement process.

BACKGROUND

Automated Fiber Placement (AFP) research is plagued by the inability to accurately measure temperature of materials as they are being placed on a mold. Existing temperature measurement methods utilize thermocouples and infrared thermography. Neither of these methods can detect the temperature within the material. They can only measure surface temperature.

Accordingly, it is an object of the present disclosure to solve this issue by utilizing an antenna to measure a current induced within the material by an electromagnetic coil. The materials utilized in AFP have well established thermal and electrical properties. One of which is electrical resistivity as a function of distance and temperature. With a fixed distance between an excitation coil and a receiving antenna, the temperature of the material can be determined by applying these relationships.

Citation or identification of any document in this application is not an admission that such a document is available as prior art to the present disclosure.

SUMMARY

The above objectives are accomplished according to the present disclosure by providing in one embodiment a method for measuring temperatures of materials during a high-temperature composite process. The method may include measuring a temperature of a material being heated in a process via, inducing a current within the material via an electromagnetic coil, placing at least one antennae at a distance from the material, receiving a signal generated by the current with the at least one antennae, wherein the at least one antennae is coupled to a device for measuring a strength of the current via the signal generated by the current, processing the signal generated by the current via a micro-controller device to interpret the strength of the current, wherein the strength of the current is proportional to a distance the current must travel through the material, wherein the strength of the signal indicates the temperature of the material in the process, all performed without physically contacting the material being measured for temperature. Still, the material being measured may be being processed by an Automated Fiber Placement machine. Further, the material in the process may be a carbon fiber material. Yet again, the electromagnetic coil may at least partially surround the material. Further again, the method may include heating the material with a heating element.

In a further embodiment a system for measuring temperatures of materials during a high-temperature composite process is provided. The system may include a material being heated in a process, an electromagnetic coil to induce a current within the material, at least one antennae placed at a distance from the material, a signal generated by the current and received with the at least one antennae, the antennae coupled to a device for measuring a strength of the current via the signal generated by the current, a micro-controller device that processes the signal to interpret the strength of the current, wherein the strength of the current is proportional to a distance the current must travel through the material, wherein the strength of the signal indicates a temperature of the material in the process; and the system is configured such that no part of the system physically contacts the material being measured for temperature. Still again, the material being measured may be in an Automated Fiber Placement machine. Further, the material in the process may be a carbon fiber material. Yet again, the electromagnetic coil may at least partially surrounds the material. Moreover, the system may include a heating element to heat the material.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 1 shows one embodiment of a temperature measurement system of the current disclosure.

The FIGURES herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase “x to y” includes the range from ‘x’ to ‘y’ as well as the range greater than ‘x’ and less than ‘y’. The range can also be expressed as an upper limit, e.g. ‘about x, y, z, or less’ and should be interpreted to include the specific ranges of ‘about x’, ‘about y’, and ‘about z’ as well as the ranges of ‘less than x’, less than y', and ‘less than z’. Likewise, the phrase ‘about x, y, z, or greater’ should be interpreted to include the specific ranges of ‘about x’, ‘about y’, and ‘about z’ as well as the ranges of ‘greater than x’, greater than y', and ‘greater than z’. In addition, the phrase “about ‘x’ to ‘y’”, where ‘x’ and ‘y’ are numerical values, includes “about ‘x’ to about ‘y’”.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as “about” that particular value in addition to the value itself. For example, if the value “10” is disclosed, then “about 10” is also disclosed. Ranges can be expressed herein as from “about” one particular value, and/or to “about” another particular value. Similarly, when values are expressed as approximations, by use of the antecedent “about,” it will be understood that the particular value forms a further aspect. For example, if the value “about 10” is disclosed, then “10” is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of “about 0.1% to 5%” should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms “a”, “an”, and “the” include both singular and plural referents unless the context clearly dictates otherwise.

As used herein, “about,” “approximately,” “substantially,” and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms “about,” “approximate,” “at or about,” and “substantially” can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is “about,” “approximate,” or “at or about” whether or not expressly stated to be such. It is understood that where “about,” “approximate,” or “at or about” is used before a quantitative value, the parameter also includes the specific quantitative value itself, unless specifically stated otherwise.

The term “optional” or “optionally” means that the subsequent described event, circumstance or substituent may or may not occur, and that the description includes instances where the event or circumstance occurs and instances where it does not.

As used herein, "tangible medium of expression" refers to a medium that is physically tangible or accessible and is not a mere abstract thought or an unrecorded spoken word. "Tangible medium of expression" includes, but is not limited to, words on a cellulosic or plastic material, or data stored in a suitable computer readable memory form. The data can be stored on a unit device, such as a flash memory or CD-ROM or on a server that can be accessed by a user via, e.g. a web interface.

As used herein, "therapeutic" can refer to treating, healing, and/or ameliorating a disease, disorder, condition, or side effect, or to decreasing in the rate of advancement of a disease, disorder, condition, or side effect. A "therapeutically effective amount" can therefore refer to an amount of a compound that can yield a therapeutic effect.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Kits

Any of the devices, systems or methods described herein can be presented as a combination kit. As used herein, the terms "combination kit" or "kit of parts" refers to the components and devices described herein as well as any additional components that are used to package, sell, market, deliver, and/or use the combination of elements or a single element contained therein. Such additional components include, but are not limited to, packaging, blister packages, and the like. When the devices, systems or methods described herein, or a combination thereof (e.g., sensing antennae, induction coil, carbon fiber tape, etc.), contained in the kit are administered simultaneously, the combination kit can contain the devices, systems, methods in a single combination, such as a complete temperature measurement kit. When the devices, systems, methods described herein or a combination thereof and/or kit components are not employed simultaneously, the combination kit can contain each device necessary for accomplishing the system or method in separate packaging. The separate kit components can be contained in a single package or in separate packages within the kit.

In some embodiments, the combination kit also includes instructions printed on or otherwise contained in a tangible medium of expression. The instructions can provide information regarding the devices, safety information regarding their use, information regarding employing the systems and methods described herein, and/or recommended uses for the devices, methods, and systems contained therein.

This novel disclosure could be utilized on all Automated Fiber Placement machines around the world. In addition, any notable high-temperature composites process would be a potential target for this tool. This includes thermoplastic matrix composite processing techniques such as induction welding and hot-pressing. The advent of ceramic matrix composites and the need to monitor in-situ temperatures during the sintering for their manufacturing also becomes clear.

This device, and the systems and methods accompanying same, is the only device that offers an exact measurement of temperature of material during Automated Fiber Placement without contacting the material. This allows the potential for more accurate materials science and enhanced production quality of AFP manufactured components.

This disclosure measures temperature of a substrate or material that has been placed with an Automated Fiber Placement (AFP) machine without physically contacting the material. The invention utilizes an electromagnetic coil to induce a specified amount of current within a carbon fiber material being placed by the AFP machine. An antenna placed at a specific distance along the material from the electromagnetic coil receives the signal generated by this current and is coupled to a device, such as an ammeter, Galvanometer, or other device as known to those of skill in the art, which measures the strength of this current. The strength of the current is proportional to the distance the current must travel through the conductive medium. The measured signal is then processed by a micro-controller device to interpret the signal strength to substrate temperature utilizing long established material properties.

A device wirelessly transmits an electrical signal to a carbon fiber material. This signal is carried along the conductive material and then is received by an antenna, and the measured signal strength from the receiving antenna is used to correlate to temperature of the media.

FIG. 1 shows one embodiment of a system 100 that may be employed via the current disclosure. System 100 may include sensing antenna 102 for sensing inductance and capacitance, heating element 104 for heating carbon fiber tape via heat 106, primary induction coil 108, and at least one carbon fiber tape (tow) 110 upon which the system acts.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A method for measuring temperatures of materials during a high-temperature composite process comprising:

measuring a temperature of a material being heated in a process while the material is being placed by an Automated Fiber Placement machine via:

inducing a current within the material via an electromagnetic coil within a carbon fiber material being placed by the Automated Fiber Placement machine;

placing at least one antennae at a distance from the material and at a predetermined distance along the material from the electromagnetic coil;

receiving a signal generated by the current with the at least one antennae positioned along the material from the electromagnetic coil, the signal being generated by current carried along the material;

wherein the at least one antennae is coupled to a device for measuring a strength of the current via the signal generated by the current, the device comprising an ammeter or galvanometer coupled to the at least one antennae;

processing the signal generated by the current via a micro-controller device to interpret the strength of the current, wherein the strength of the current is proportional to a distance the current must travel through the material between the electromagnetic coil and the at least one antennae, wherein a strength of the signal generated by the current indicates the temperature of the material in the process; and all performed without physically contacting the material being measured for temperature, while the material is being heated with a heating element during an Automated Fiber Placement process.

2. The method of claim 1, wherein the material being measured is processed by the Automated Fiber Placement machine and comprises a carbon fiber tow being placed on a mold.

3. The method of claim 1, wherein the electromagnetic coil at least partially surrounds the material while the at least one antennae is positioned at the predetermined distance along the material from the electromagnetic coil.

* * * * *